(12) United States Patent
Chae et al.

(10) Patent No.: US 10,516,331 B2
(45) Date of Patent: Dec. 24, 2019

(54) POWER CONVERSION DEVICE AND AIR CONDITIONER COMPRISING SAME

(71) Applicant: LG ELECTRONICS INC., Seoul (KR)

(72) Inventors: Seungwoo Chae, Seoul (KR); Sanghyeon Kim, Seoul (KR); Jeongeon Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/741,227

(22) PCT Filed: Jun. 30, 2016

(86) PCT No.: PCT/KR2016/007047
§ 371 (c)(1),
(2) Date: Dec. 29, 2017

(87) PCT Pub. No.: WO2017/003221
PCT Pub. Date: Jan. 5, 2017

(65) Prior Publication Data
US 2018/0226881 A1 Aug. 9, 2018

(30) Foreign Application Priority Data

Jul. 2, 2015 (KR) ........................ 10-2015-0094888

(51) Int. Cl.
*H02M 1/14* (2006.01)
*H02M 7/06* (2006.01)
(Continued)

(52) U.S. Cl.
CPC ................. *H02M 1/14* (2013.01); *F24F 3/00* (2013.01); *F24F 11/46* (2018.01); *F24F 11/62* (2018.01);
(Continued)

(58) Field of Classification Search
CPC .... H02M 7/06; H02M 3/1584; H02M 1/4216; H02M 1/14; H02J 3/383
(Continued)

(56) References Cited

U.S. PATENT DOCUMENTS 8,072,193 B2 * 12/2011 Yang ................... H02M 3/1584
323/213
2007/0253223 A1 * 11/2007 Neidorff ............. H02M 1/4216
363/2

(Continued)

FOREIGN PATENT DOCUMENTS

| JP | 2004-304959 | 10/2004 |
|----|-------------|---------|
| JP | 2010-246183 | 10/2010 |

(Continued)

OTHER PUBLICATIONS

International Search Report (with English Translation) and Written Opinion dated Oct. 24, 2016 issued in Application No. PCT/KR2016/007047.

*Primary Examiner* — Bickey Dhakal
*Assistant Examiner* — Cortez M Cook
(74) *Attorney, Agent, or Firm* — KED & Associates LLP

(57) ABSTRACT

The present invention relates to a power conversion device and an air conditioner comprising the same. The power conversion device may include: an interleaved boost converter; a dc terminal capacitor; a load; and a controller for controlling the interleaved boost converter, wherein the controller controls the phase difference between a first boost converter and second boost converter of the interleaved boost converter so that the phase difference is a first phase difference in a first mode, and if a current ripple flowing in the dc terminal capacitor is a predetermined value or greater, the controller enters a second mode and controls the phase difference between the first boost converter and second boost converter so that the phase difference varies. Accord- (Continued)

ingly, the ripple current flowing into a capacitor disposed at the output terminal of an interleaved boost converter can be reduced.

13 Claims, 16 Drawing Sheets

(51) Int. Cl.
| | |
|---|---|
| *H02J 3/38* | (2006.01) |
| *F24F 3/00* | (2006.01) |
| *H02M 3/158* | (2006.01) |
| *F24F 11/62* | (2018.01) |
| *F24F 11/46* | (2018.01) |
| *H02M 1/42* | (2007.01) |
| *H02M 5/44* | (2006.01) |
| *F24F 11/88* | (2018.01) |

(52) U.S. Cl.
CPC ........... *F24F 11/88* (2018.01); *H02M 1/4225* (2013.01); *H02M 3/158* (2013.01); *H02M 3/1582* (2013.01); *H02M 5/44* (2013.01); H02M 2003/1586 (2013.01)

(58) Field of Classification Search
USPC ........................................ 363/1, 2; 417/410.1
See application file for complete search history.

(56) References Cited

U.S. PATENT DOCUMENTS

| | | | |
|---|---|---|---|
| 2011/0132899 A1* | 6/2011 | Shimomugi | H02M 3/1584 219/620 |
| 2013/0235631 A1 | 9/2013 | Pahlevaninezhad et al. | |
| 2014/0271272 A1* | 9/2014 | Jeon | H02M 7/06 417/410.1 |
| 2015/0016159 A1* | 1/2015 | Deboy | H02J 3/383 363/71 |

FOREIGN PATENT DOCUMENTS

| | | |
|---|---|---|
| JP | 2013-070614 | 4/2013 |
| KR | 10-2014-0112297 | 9/2014 |

\* cited by examiner

POWER CONVERSION DEVICE AND AIR CONDITIONER COMPRISING SAME

CROSS-REFERENCE TO RELATED PATENT APPLICATIONS

This application is a U.S. National Stage Application under 35 U.S.C. § 371 of PCT Application No. PCT/KR2016/007047, filed Jun. 30, 2016, which claims priority to Korean Patent Application No. 10-2015-0094888, filed Jul. 2, 2015, whose entire disclosures are hereby incorporated by reference.

TECHNICAL FIELD

The present invention relates to a power conversion device and an air conditioner comprising the same, and more particularly to, a power conversion device that can reduce a ripple current flowing into a capacitor disposed at the output terminal of an interleaved boost converter, and an air conditioner comprising the same.

BACKGROUND ART

A power conversion device is included in electronic appliances for operating them. For example, the power conversion device converts alternating current power to direct current power or converts the level of direct current power.

Meanwhile, an air conditioner, which is an electronic appliance, is installed to provide a more comfortable interior environment for humans by directing cold or warm air into a room to adjust the room temperature and purify the indoor air. Typically, the air conditioner includes an indoor unit composed of a heat exchanger and installed indoors, and an outdoor unit composed of a compressor, a heat exchanger, etc. and supplying refrigerant to the indoor unit.

The air conditioner operates with input alternating current voltage—in particular, a motor is driven by an inverter. In this case, the operation may become temporarily unstable as the load connected to the inverter varies.

DISCLOSURE

Technical Problem

An aspect of the present invention is to provide a power conversion device that can reduce a ripple current flowing into a capacitor disposed at the output terminal of an interleaved boost converter, and an air conditioner comprising the same.

Technical Solution

According to an exemplary embodiment of the present invention to achieve the above aspect, there is provided a power conversion device including: an interleaved boost converter; a dc terminal capacitor connected to an output terminal of the interleaved boost converter; a load connected to the dc terminal capacitor; and a controller for controlling the interleaved boost converter, wherein the controller controls the phase difference between a first boost converter and second boost converter of the interleaved boost converter so that the phase difference is a first phase difference in a first mode, and if a current ripple flowing in the dc terminal capacitor is a predetermined value or greater, the controller enters a second mode and controls the phase difference between the first boost converter and second boost converter of the interleaved boost converter so that the phase difference varies.

According to another exemplary embodiment of the present invention to achieve the above aspect, there is provided a power conversion device including: an interleaved boost converter; a dc terminal capacitor connected to an output terminal of the interleaved boost converter; a load connected to the dc terminal capacitor; and a controller for controlling the interleaved boost converter, wherein the controller controls the phase difference between a first boost converter and second boost converter of the interleaved boost converter so that the phase difference varies with the load.

According to still another exemplary embodiment of the present invention to achieve the above object, there is provided an air conditioner including: a compressor that compresses a refrigerant; a heat exchanger that transfers heat using the compressed refrigerant; and a power conversion device for driving the compressor, the power conversion device including: an interleaved boost converter; a dc terminal capacitor connected to an output terminal of the interleaved boost converter; a load connected to the dc terminal capacitor; and a controller for controlling the interleaved boost converter, wherein the controller controls the phase difference between a first boost converter and second boost converter of the interleaved boost converter so that the phase difference is a first phase difference in a first mode, and if a current ripple flowing in the dc terminal capacitor is a predetermined value or greater, the controller enters a second mode and controls the phase difference between the first boost converter and second boost converter of the interleaved boost converter so that the phase difference varies.

According to a further exemplary embodiment of the present invention to achieve the above object, there is provided an air conditioner including: a compressor that compresses a refrigerant; a heat exchanger that transfers heat using the compressed refrigerant; and a power conversion device for driving the compressor, the power conversion device including: an interleaved boost converter; a dc terminal capacitor connected to an output terminal of the interleaved boost converter; a load connected to the dc terminal capacitor; and a controller for controlling the interleaved boost converter, wherein the controller controls the phase difference between a first boost converter and second boost converter of the interleaved boost converter so that the phase difference varies with the load.

Advantageous Effects

A power conversion device and an air conditioner comprising the same according to an exemplary embodiment of the present invention can reduce a ripple current flowing into a capacitor disposed at the output terminal of an interleaved boost converter, since the power conversion device includes: an interleaved boost converter; a dc terminal capacitor connected to an output terminal of the interleaved boost converter; a load connected to the dc terminal capacitor; and a controller for controlling the interleaved boost converter, wherein the controller controls the phase difference between a first boost converter and second boost converter of the interleaved boost converter so that the phase difference is a first phase difference in a first mode, and if a current ripple flowing in the dc terminal capacitor is a predetermined value or greater, the controller enters a second mode and controls the phase difference between the first boost converter and second boost converter of the interleaved boost converter so that the phase difference varies.

Meanwhile, a capacitor with a low capacitance can be used since a ripple current flowing into the capacitor is stably reduced. Accordingly, the manufacturing costs can be reduced.

A power conversion device and an air conditioner comprising the same according to another exemplary embodiment of the present invention can reduce, in real time, a ripple current flowing into a capacitor disposed at the output terminal of an interleaved boost converter, since the power conversion device includes: an interleaved boost converter; a dc terminal capacitor connected to an output terminal of the interleaved boost converter; a load connected to the dc terminal capacitor; and a controller for controlling the interleaved boost converter, wherein the controller controls the phase difference between a first boost converter and second boost converter of the interleaved boost converter so that the phase difference varies with the load.

In particular, it is possible to reduce a ripple current flowing into a capacitor disposed at the output terminal of an interleaved boost converter by controlling the first boost converter and second boost converter of the interleaved boost converter so that the phase difference increases as the load increases.

MODE FOR INVENTION

Hereinafter, the present invention will be described in more detail with reference to the drawings.

The suffixes "module" and "unit" for components used in the description below are assigned or mixed in consideration of easiness in writing the specification and, do not have distinctive meanings or roles by themselves. Thus, the suffixes "module" and "unit" may be used interchangeably.

Figure 1:
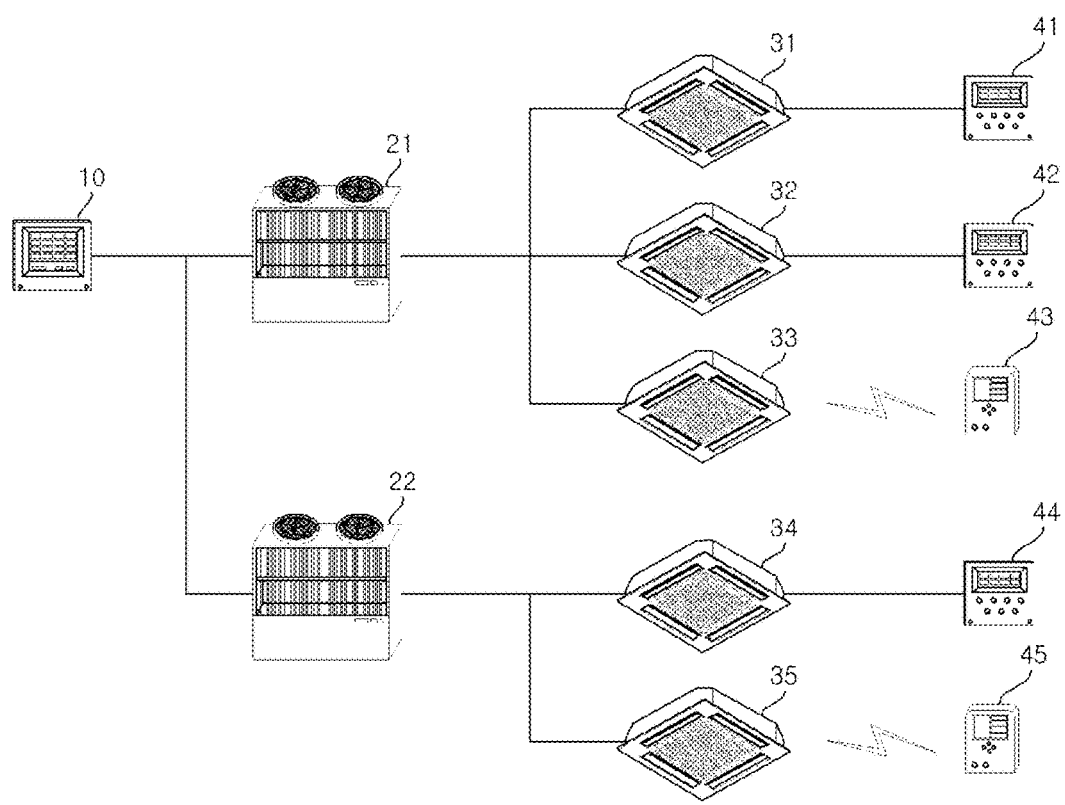
FIG. 1 is a diagram illustrating a configuration of an air conditioner according to an exemplary embodiment of the present invention.

FIG. 1 is a diagram illustrating a configuration of an air conditioner according to an exemplary embodiment of the present invention.

As shown in FIG. 1, an air conditioner according to an exemplary embodiment of the present invention is a large air conditioner 50, and may include a plurality of indoor units 31 to 35, a plurality of outdoor units 21 and 22 connected to the plurality of indoor units, remote controls 41 to 45 respectively connected to the plurality of indoor units, and a remote controller 10 controlling the plurality of indoor units and outdoor units.

The remote controller 10 is connected to the plurality of indoor units 31 to 36 and the plurality of outdoor units 21 and 22 and monitors and controls their operations. In this case, the remote controller 10 may be connected to the plurality of indoor units and perform operation setup, lock settings, schedule control, group control, etc. on the indoor units.

Although the air conditioner may be any one of the following: a standing air conditioner, a wall-mounted air conditioner, and a ceiling-mounted air conditioner, the ceiling-mounted air conditioner will be given below as an example for convenience of explanation. Also, the air conditioner may further include at least one among a ventilator, an air cleaner, a humidifier, and a heater, and may operate in tandem with the operations of the indoor units and outdoor units.

The outdoor units 21 and 22 include a compressor (not shown) that is supplied with a refrigerant and compresses it, an outdoor heat exchanger (not shown) that transfers heat between the refrigerant and the outside air, an accumulator (not shown) that extracts a gaseous refrigerant from the supplied refrigerant, and a four-way valve (not shown) that selects a refrigerant flow path for heating operation. Also, the outdoor units 21 and 22 further includes a plurality of sensors, valves, an oil recovery unit, etc., but descriptions of these components will be omitted below.

The outdoor units 21 and 22 runs the compressor and outdoor heat exchanger included in them to compress the refrigerant or transfer heat depending on the settings and supply the refrigerant to the indoor units 31 to 35. The outdoor units 21 and 22 are run by a request from the remote controller 10 or indoor units 31 to 35, and the number of running outdoor units and the number of running compressors installed in the outdoor units vary as the cooling/heating capacity varies in response to the indoor units being run.

Although the description here will be given on the assumption that a plurality of outdoor units 22 and 22 supply refrigerant to each of individually connected indoor units, a plurality of outdoor units may be mutually connected and supply refrigerant to a plurality of indoor units depending on the connection structure of the outdoor units and indoor units.

The indoor units 31 to 35 may be connected to one of the plurality of outdoor units 21 and 22 and supplied with a refrigerant and release warm air into the room. The indoor units 31 to 35 include an indoor heat exchanger (not shown), an indoor unit fan (not shown), an expansion valve (not shown) for expanding the supplied refrigerant, and a plurality of sensors (not shown).

In this case, the outdoor units 21 and 22 and the indoor units 31 to 35 are connected by communication lines and send and receive data to each other, and the outdoor units and the indoor units are connected to the remote controller 10 by a separate communication line and operate under control of the remote controller 10.

The remote controls 41 to 45 are connected to the indoor units, respectively, and may send a user control command to the indoor units and receive and show the indoor units' status information. In this case, the remote controls communicate in a wireless or wired manner depending on how they are connected to the indoor units, and in some cases, one remote control may be connected to multiple indoor units and the multiple indoor units' settings may be changed via input from the one remote control.

Moreover, the remote controls 41 to 45 may internally include a temperature detecting sensor.

Figure 2:
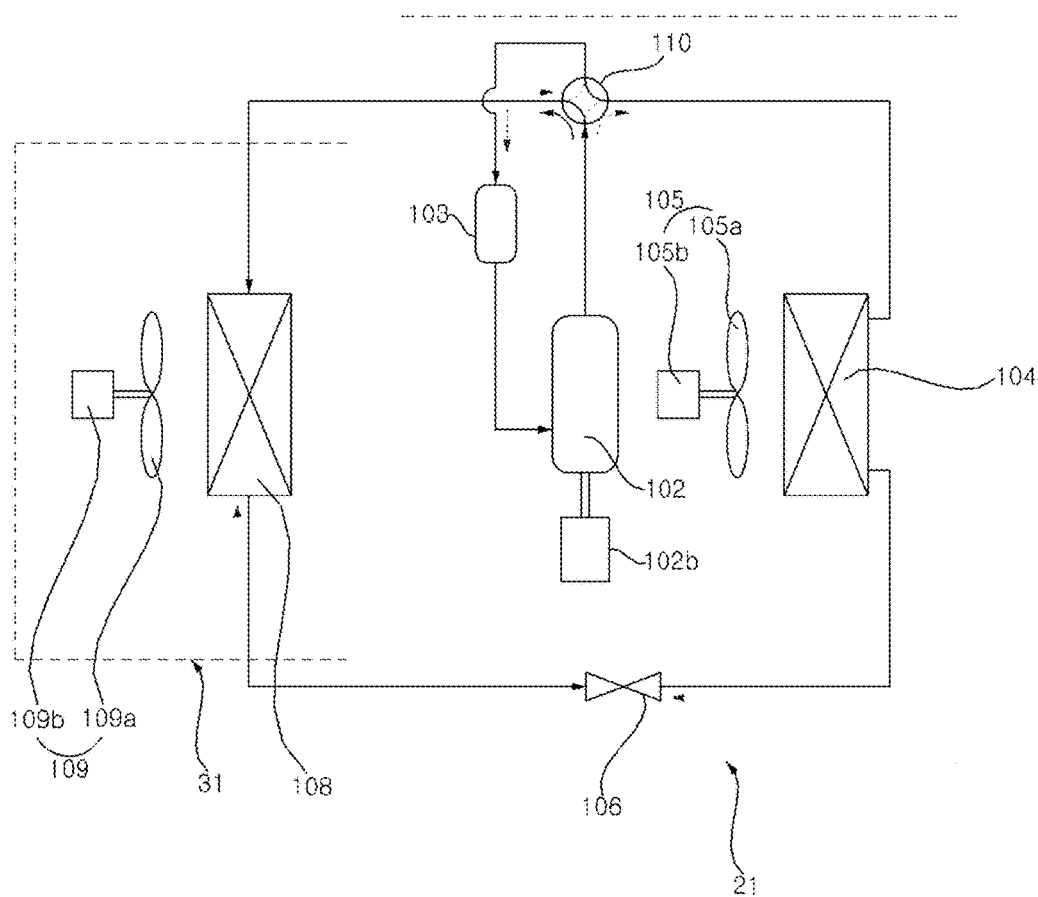
FIG. 2 is a schematic diagram of an outdoor unit and indoor unit of FIG. 1.

FIG. 2 is a schematic diagram of an outdoor unit and indoor unit of FIG. 1.

Referring to the drawing, the air conditioner 50 is largely divided into an indoor unit 31 and an outdoor unit 21.

The outdoor unit 21 includes a compressor 102 serving to compress a refrigerant, a compressor motor 102b running the compressor, an outdoor heat exchanger 104 serving to release the compressed refrigerant, an outdoor blower 105a disposed at one side of the outdoor heat exchanger 104 and consisting of an outdoor fan and facilitating the release of refrigerant and a motor 105b rotating the outdoor fan 105a, a cooling/heating switching valve 110 changing the flow path of the compressed refrigerant, and an accumulator 103 temporarily storing a gaseous refrigerant and removing moisture and impurities from it and then supplying a refrigerant under a certain pressure to the compressor.

The indoor unit 31 includes an indoor heat exchanger 109 disposed indoors and performing cooling/heating functions, and an indoor blower 109a disposed at one side of the indoor heat exchanger 109 and consisting of an indoor fan 109a facilitating the release of refrigerant and a motor 109b rotating the indoor fan 109a.

At least one indoor heat exchanger 109 may be installed. At least one between an inverter compressor and a constant-speed compressor may be used as the compressor 102.

Moreover, the air conditioner 50 may be configured as a cooling machine for cooling a room or as a heat pump for cooling or heating a room.

Meanwhile, although FIG. 2 depicts one indoor unit 31 and one outdoor unit 21, an apparatus for operating an air conditioner according to an exemplary embodiment of the present invention is not limited to this, a multi-type air conditioner with a plurality of indoor units and outdoor units and an air conditioner with a single indoor unit and a plurality of outdoor units may be applicable.

Figure 3:
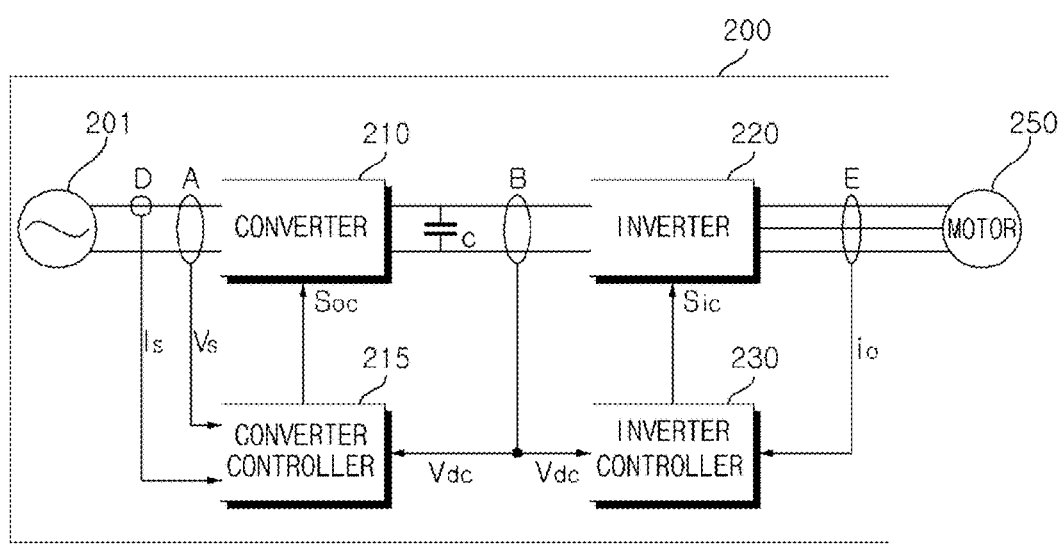
FIG. 3 is a block diagram of a power conversion device within an outdoor unit of FIG. 1.

FIG. 3 is a block diagram of a power conversion device within an outdoor unit of FIG. 1.

Referring to the drawing, the power conversion device 200 is a power conversion device for running a compressor, and may run a compressor motor 250. Meanwhile, the compressor 102 may be run by running the compressor motor 250.

To this end, the power conversion device 200 may include an inverter 220 outputting a three-phase alternating current to the compressor motor 250, an inverter controller 230 controlling the inverter 220, a converter 210 supplying direct current power to the inverter 220, and a converter controller 215 controlling the converter 210.

Meanwhile, the power conversion device 200 is supplied with alternating current power from a system, converts power, and supplies the converted power to the compressor motor 250. Thus, the power conversion device 200 may be considered as a compressor driver. Hereinafter, the terms "compressor driver" and "power conversion device" may be used interchangeably.

Meanwhile, according to the present invention, in the power conversion device 200, the converter 210 supplying direct current power to the inverter 220 receives three-phase alternating current and converts it into direct current power. To this end, the converter 210 may have a rectifier (510 of FIG. 5A) an interleaved boost converter (520 of FIG. 5A or FIG. 5B). Besides, a reactor (not shown) may be further provided.

A dc terminal capacitor C is connected to a dc end which is the output of the converter 210. The dc terminal capacitor C may store power output from the converter 210.

The converter controller 215 may control the converter 210 which has a switching element. It may control the interleaved boost converter (520 of FIG. 5A or FIG. 5B), particularly when the converter 210 includes the interleaved boost converter (520 of FIG. 5A or FIG. 5B) as described above.

The inverter 220 has a plurality of inverter switching elements, and may convert direct current power Vdc smoothened by the on/off operation of the switching elements into three-phase alternating current power of a predetermined frequency and output it to the three-phase motor 250.

Specifically, the inverter 220 may have a plurality of switching elements. For example, upper arm switching elements Sa, Sb, and Sc and lower arm switching element S'a, S'b, and S'c are connected in series and form pairs, respectively—that is, a total of three pairs of upper and lower arm switching elements Sa & S'a, Sb & S'b, and Sc & S'c may be connected in parallel to one another. Also, the switching element Sa, S'a, Sb, S'b, Sc, and S'c may have diodes connected in inverse parallel.

The inverter controller 230 may output an inverter switching control signal Sic to the inverter 220, in order to control the switching operation of the inverter 220. The inverter switching control signal Sic is a pulse width modulated (PWM) switching control signal, and may be generate and output based on an output current $i_o$ flowing through the motor 250 or a dc terminal voltage Vdc at both ends of the dc terminal capacitor. The output current $i_o$ may be detected by an output current detector E, and the dc terminal voltage Vdc may be detected by a dc terminal voltage detector B.

The dc terminal voltage detector B may detect the voltage Vdc stored in the dc terminal capacitor C. To this end, the dc terminal voltage detector B may have a VT (voltage transformer) or a resistive element. The detected dc terminal voltage Vdc is input into the inverter controller 230.

The output current detector E may detect the output current $i_o$ flowing between the inverter 420 and the motor 250. That is, the current flowing through the motor 250 is detected. The output current detector E may detect output currents ia, ib, and is of all phases, or may detect output currents of two phases by using three-phase balance.

The output current detector E may be positioned between the inverter 220 and the motor 250, and may use a CT (current transformer), a shunt resistor, etc. for current detection.

Meanwhile, with regard to an exemplary embodiment of the present invention, the converter controller 215 may control a first boost converter and second boost converter of the interleaved boost converter (520 of FIG. 5A or FIG. 5B) so that the phase difference between them is a first phase difference in a first mode, and if a current ripple flowing in the dc terminal capacitor C is a predetermined value or greater, the converter controller 215 enters a second mode and controls the phase difference between the first boost converter and second boost converter of the interleaved boost converter 520 so that the phase difference varies.

For example, if the interleaved boost converter (520 of FIG. 5A or FIG. 5B) includes two boost converters, the converter controller 215 may control the two boost converters to operate with a phase difference of 180° in the first mode.

Meanwhile, if a current ripple flowing in the dc terminal capacitor C is a predetermined value or greater, the converter controller 215 may enter a second mode and control the phase difference between the first boot converter and second boost converter of the interleaved boost converter (520 of FIG. 5A or FIG. 5B) so that the phase difference between them varies, in order to protect the elements in the dc terminal capacitor C.

That is, the converter controller 215 may control the first boost converter and second boost converter of the interleaved boost converter (520 of FIG. 5A or FIG. 5B) so that the phase difference between the first boost converter and second boost converter of the interleaved boost converter is not 180° in the second mode. Accordingly, the ripple current flowing into the dc terminal capacitor C disposed at the output terminal of the interleaved boost converter (520 of FIG. 5A or 5B) can be reduced. Accordingly, a capacitor with a low capacitance can be used, and therefore the manufacturing costs can be reduced.

Meanwhile, the converter controller 215 may vary the phase difference between the first boost converter and second boost converter of the interleaved boost converter (520 of FIG. 5A or 5B) so that the current output from the interleaved boost converter (520 of FIG. 5A or 5B) and the current flowing into a load 205 are synchronized in the second mode.

Meanwhile, the converter controller 215 may vary the phase difference between the first boost converter and second boost converter of the interleaved boost converter (520 of FIG. 5A or 5B) so that the overlap region between the current output from the interleaved boost converter (520 of FIG. 5A or 5B) and the current flowing into the load 205 is the largest in the second mode.

Meanwhile, if the number of boost converters within the interleaved boost converter (520 of FIG. 5A or FIG. 5B) is n, the converter controller 215 may control the boost converters to have a phase difference of 360°/n in the first mode.

Figure 4A:
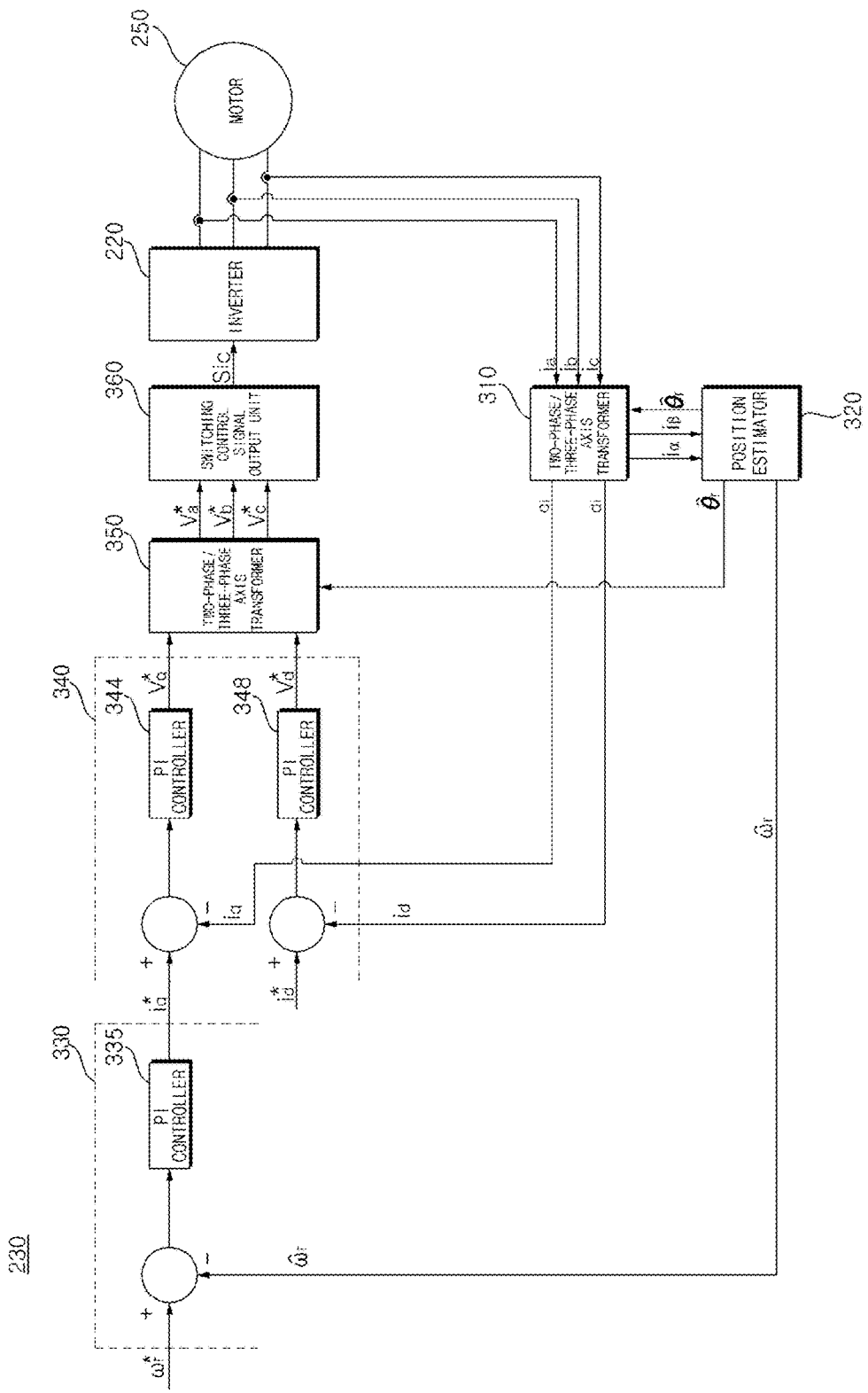
FIG. 4A is an internal block diagram of the inverter controller of FIG. 3.

FIG. 4 is an internal block diagram of the inverter controller of FIG. 3.

Referring to FIG. 4, the inverter controller 230 may include an axis transformer 310, a position estimator 320, a current command generator 330, a voltage command generator 340, an axis transformer 350, and a switching control signal output part 360.

The axis transformer 310 may receive three-phase output currents ia, ib, and is detected by the output current detector E and transform them into two-phase currents iα and iβ of a stationary coordinate system.

Meanwhile, the axial transformer 310 may transform the two-phase current iα and iβ of the stationary coordinate system into two-phase currents id and iq of a rotating coordinate system.

The position estimator 320 estimates the rotor position $\hat{\theta}_r$ of the motor 250 based on the two-phase current iα and iβ of the stationary coordinate system, obtained by the transformation by the axis transformer 320. Also, a calculated speed may be output based on the estimated rotor position $\hat{\theta}_r$.

Meanwhile, the current command generator 330 calculates a speed command value $\omega^*_q$ based on the calculated speed $\hat{\omega}^*_p$, and a target speed $\omega$, generates a current command value $i^*_q$ based on the speed command value $\omega^*_q$. For example, the current command generator 330 may perform PI control by a PI controller 635 and generate the current command value $i^*_q$, based on the speed command value $\omega^*_q$ which is the difference between the calculated speed $\hat{\omega}^*_p$ and the target speed $\omega$. Although the figure illustrates a q-axis current command value $i^*_q$ as the current command value, a d-axis current command value $i^*_d$ as well may be generated unlike in the figure. Meanwhile, the d-axis current command value $i^*_d$ may be set to 0.

Meanwhile, the current command generator 330 may further include a limiter (not shown) that limits the level of the current command value $i^*_q$ to keep it from going beyond a permissible range.

Next, the voltage command generator 340 generates d-axis and q-axis voltage command values $v^*_d$ and $v^*_q$ based on d-axis and q-axis currents $i_d$ and $i_q$, obtained by the axis transformation to a two-phase rotating coordinate system by the axis transformer, and the current command values $i^*_d$ and $i^*_q$ from the current command generator 330. For example, the voltage command generator 340 may perform PI control by a PI controller 444 and generate the q-axis voltage command value $v^*_q$, based on the difference between the q-axis current $i_q$ and the q-axis current command value $i^*_q$. Moreover, the voltage command generator 340 may perform PI control by a PI controller 448 and generate the d-axis voltage command value $v^*_d$, based on the difference between the d-axis current $i_d$ and the d-axis current command value $i^*_d$. Meanwhile, the value of the d-axis voltage command value $v^*_d$ may be set to 0, corresponding to the d-axis current command value $i^*_d$ set to 0.

Meanwhile, the voltage command generator 340 may further include a limiter (not shown) that limits the levels of the d-axis and q-axis voltage values $v^*_d$ and $v^*_q$ to keep them from going beyond permissible ranges.

Meanwhile, the generated d-axis and q-axis voltage command values $v^*_d$ and $v^*_q$ are input into the axis transformer 350.

The axis transformer 350 receives the position $\hat{\theta}_r$ calculated by the speed calculator 320 and the d-axis and q-axis voltage command values $v^*_d$ and $v^*_q$ and perform axis transformation.

First of all, the axis transformer 350 performs transformation from the two-phase rotating coordinate system to the two-phase stationary coordinate system. In this case, the position $\hat{\theta}_r$ calculated by the speed calculator 320 may be used.

Then, the axis transformer 350 performs transformation from the two-phase stationary coordinate system to a three-phase stationary coordinate system. By this transformation, the axis transformer 1050 outputs three-phase output voltage command values v*a, v*b, and v*c.

The switching control signal output part 360 generates and outputs a pulse width modulation (PWM)-based inverter switching control signal Sic, based on the three-phase output voltage command values v*a, v*b, and v*c.

The output inverter switching control signal Sic may be converted into a gate drive signal by a gate driver (not shown) and input into the gates of the switching elements in the inverter 420. By this, the switching elements Sa, S'a, Sb, S'b, Sc, and S'c in the inverter 420 perform switching operation.

Figure 4B:
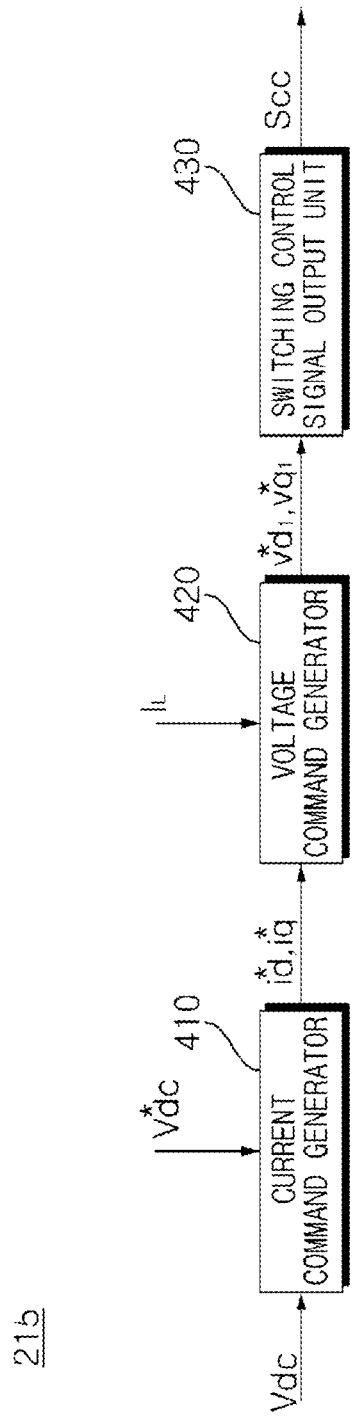
FIG. 4B is an internal block diagram of the converter controller of FIG. 3.

FIG. 4B is an internal block diagram of the converter controller of FIG. 3.

Referring to the drawing, the converter controller 215 may include a current command generator 410, a voltage command generator 420, and a switching control signal output part 430.

The current command generator 410 may generate d-axis and q-axis current command values $i^*_d$ and $i^*_q$ by a PI controller, etc., based on a dc terminal voltage Vdc detected by an output voltage detector B, i.e., the dc terminal voltage detector B, and a dc terminal voltage command value V*dc.

The voltage command generator 420 generates d-axis and q-axis voltage command values $v^*_d$ and $v^*_q$ by a PI controller, etc., based on the d-axis and q-axis current command values $i^*_d$ and $i^*_q$ and a detected input current $i_L$.

Figure 5A:
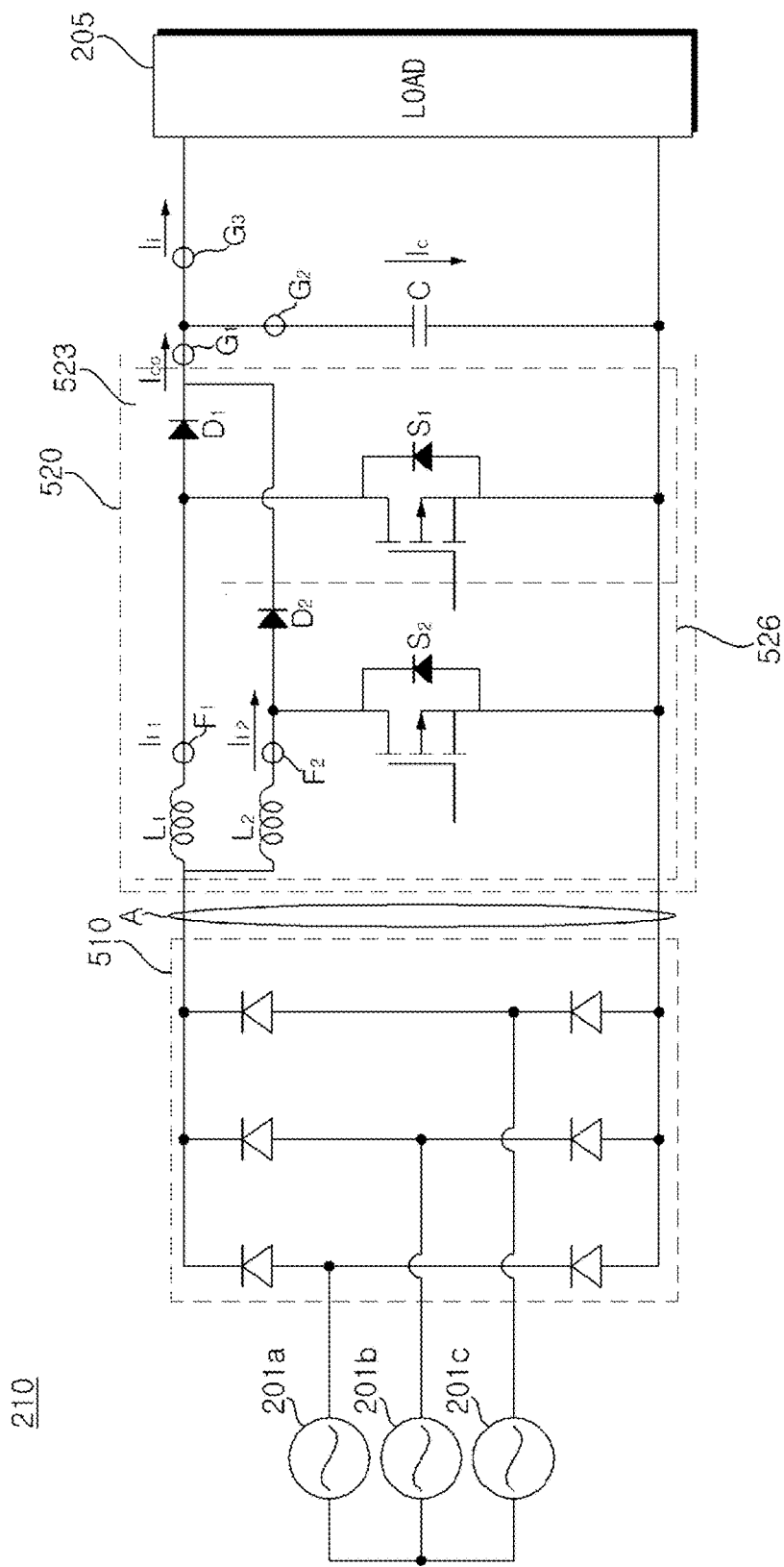
FIG. 5A is an exemplary circuit diagram of the converter of FIG. 3.

The switching control signal output part 430 may output to the boost converter 515a a converter switching control signal Scc for driving the boost switching elements S within the boost converter 515 of FIG. 5A, based on the d-axis and q-axis voltage command values $v^*_d$ and $v^*_q$.

Figure 5B:
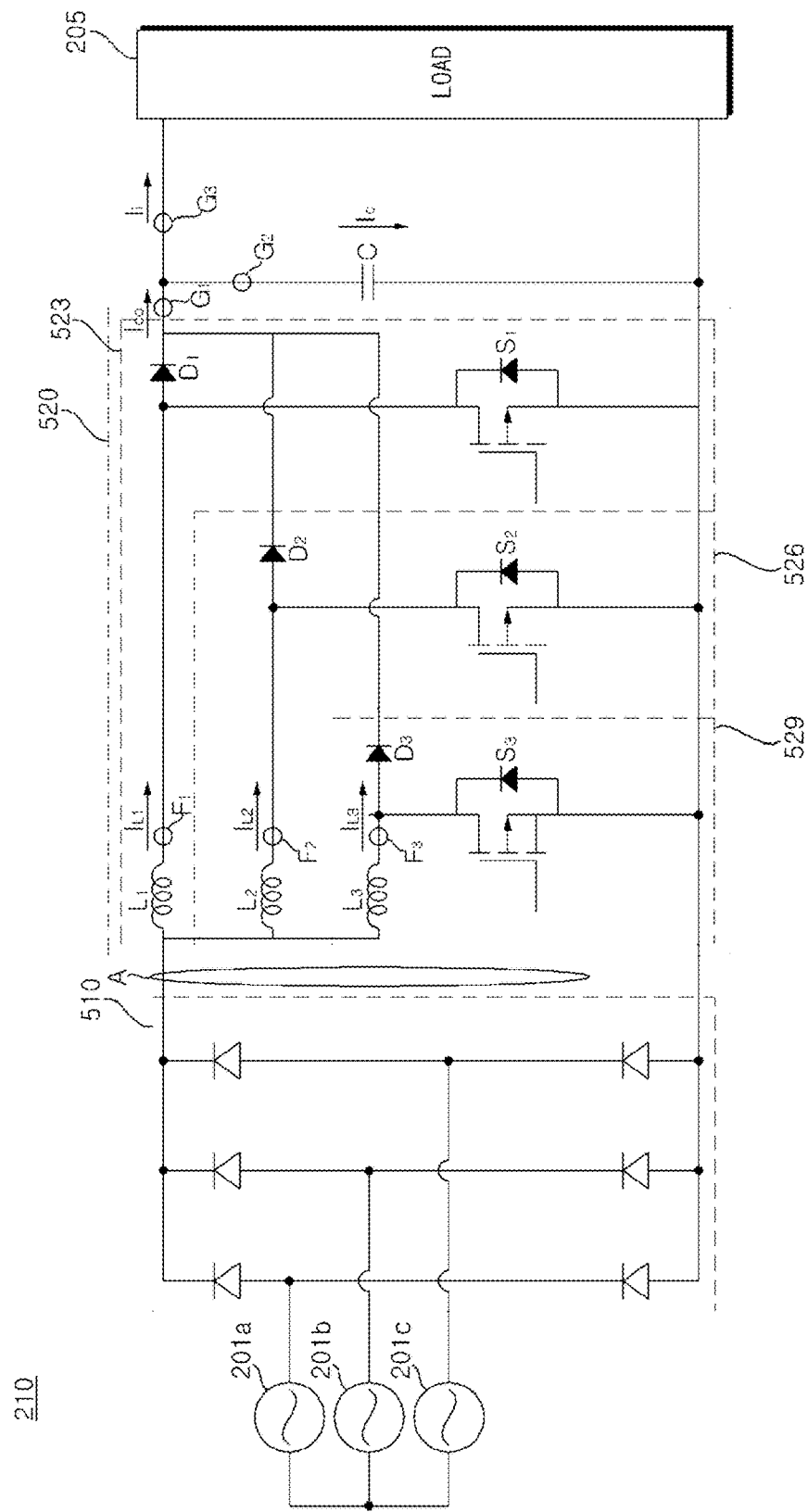
FIG. 5B is another exemplary circuit diagram of the converter of FIG. 3.

Meanwhile, in order to control the interleaved boost converter 520 of FIG. 5B, the voltage command generator 420 generates the d-axis and q-axis voltage command values $v^*_d$ and $v^*_q$ by a PI controller, etc., based on the d-axis and q-axis current command values $i^*_d$ and $i^*_q$ and first and second input currents $iL_1$ and $iL_2$ to be detected.

The switching control signal output part 430 may output a first converter switching control signal Scc1 and a second converter switching control signal Scc2 to the first boost converter 523 and the second boost converter 526, respectively, in order to drive the first boost switching element S1 within the first boost converter 523 and the second boost switching element S2 within the second boost converter 526, based on the d-axis and q-axis voltage command values $v^*_d$ and $v^*_q$.

FIG. 5A is an exemplary circuit diagram of the converter of FIG. 3.

Referring to the figure, the converter 210 may have a rectifier 510 that receives and rectifies three-phase alternating current power 210a, 201b, and 201c, and an interleaved boot converter 520.

The rectifier 510 may have a three-phase bridge diode.

The interleaved boost converter 520 may include a first boost converter 523 and a second boost converter 526 that are connected in parallel to each other and perform interleaving operation.

By voltage control using interleaving, voltage control using current distribution is enabled. Accordingly, the durability of circuit elements in the interleaved boost converter 520 can be improved. Also, ripple in input current can be reduced.

The first boost converter 523 includes an inductor L1, a diode D1 connected to the inductor L1, and a switching element S1 connected between the inductor L1 and the diode D1.

The second boost converter 526 includes an inductor L2, a diode D2 connected to the inductor L2, and a switching element S2 connected between the inductor L2 and the diode D2.

Meanwhile, an input voltage detector A for detecting an input voltage may be disposed between the rectifier 510 and the boost converter 515, and inductor current detectors F1 and F2 for detecting an input current may be disposed at the front or back of the inductors L1 and L2, respectively.

Direct current power, obtained by conversion by the converter 210, is output to and stored in the dc terminal capacitor C connected to the converter output 210.

FIG. 5B is another exemplary circuit diagram of the converter of FIG. 3.

Referring to the figure, the converter 210 may have a rectifier 510 that receives and rectifies three-phase alternating current power 210a, 201b, and 201c, and an interleaved boot converter 520.

Unlike in FIG. 5A, three boost converter may be provided. That is, the interleaved boost converter 520 may include a first boost converter 523, a second boost converter 526, and a third boost converter 529.

The description will focus on the differences with FIG. 5A. The third boost converter 529 includes an inductor L3, a diode D3 connected to the inductor L3, and a switching element S3 connected between the inductor L3 and the diode D3.

Meanwhile, an input voltage detector A for detecting an input voltage may be disposed between the rectifier 510 and the boost converter 515, and inductor current detectors F1, F2, and F3 for detecting an input current may be disposed at the front or back of the inductors L1, L2, and L3, respectively.

Meanwhile, FIGS. 5A and 5B illustrate that the load 205 is connected to both ends of the dc terminal capacitor C connected to the output terminal of the interleaved boost converter 520. In this case, the load 205 may be a concept that includes the inverter 220, as described with reference to FIG. 3, etc., which has a plurality of switching elements and outputs alternating current power to the motor 250 by using the voltage stored in the dc terminal capacitor C.

Meanwhile, when the compressor motor is driven, the load varies a lot, and therefore the direct current power stored at both ends of the dc terminal capacitor C is used, which may cause sudden instability between two ends of the dc terminal capacitor C.

Figure 6A:
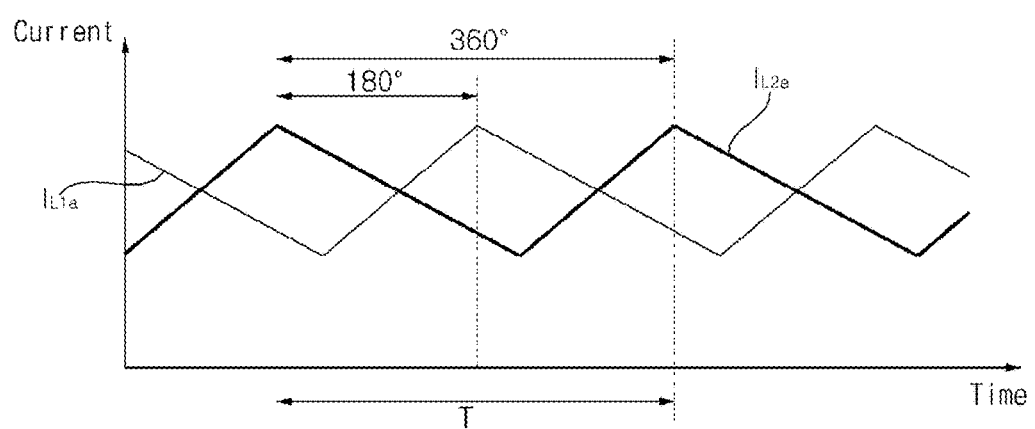
FIGS. 6A to 6c are diagrams to be used as a reference to explain the converter operation of FIG. 5A.
Figure 6B:
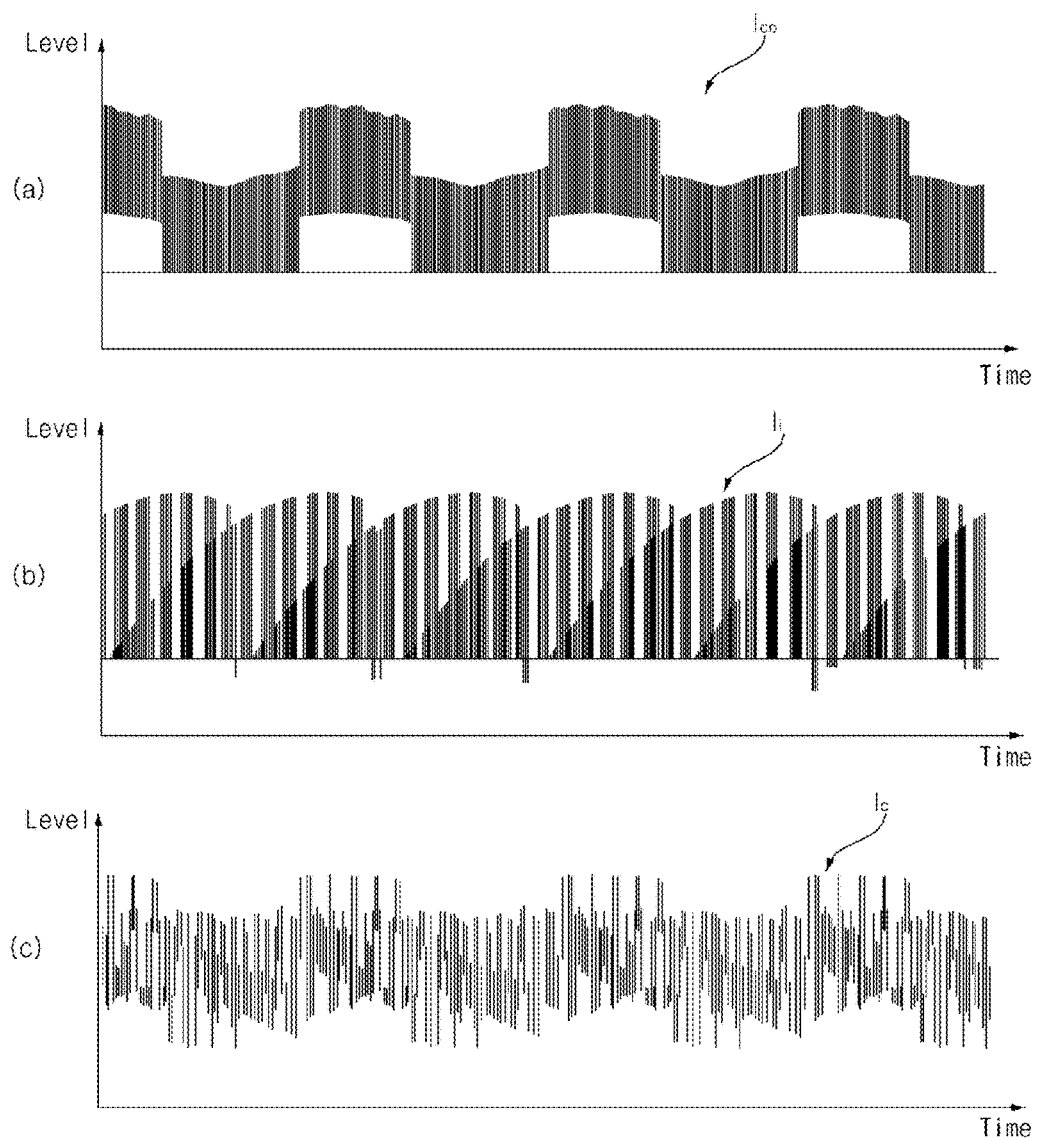
Figure 6C:
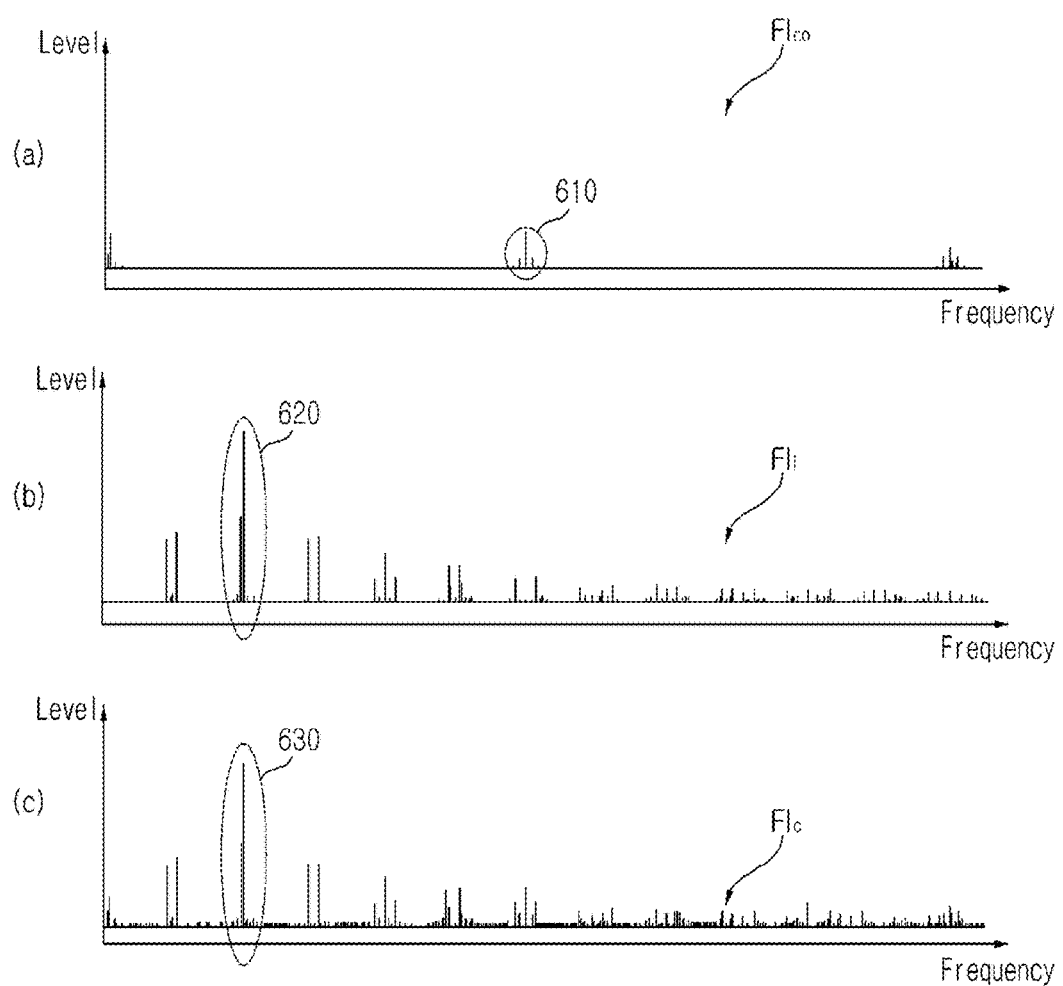

FIGS. 6A to 6c are diagrams to be used as a reference to explain the converter operation of FIG. 5A.

FIG. 6A is a view illustrating an example of the operation of the interleaved boost converter 520 of FIG. 5A.

Specifically, FIG. 6A illustrates currents $I_{L1a}$ and $I_{L2a}$ flowing in the inductors within the first boost converter 523 and second boost converter 526.

The converter controller 215 may control the boost converters within the interleaved boost converter 520 to have a phase difference of 360°/n in the first mode.

Accordingly, it is preferable that, in the first mode, the first boost converter 523 and second boost converter 526 within the interleaved boost converter 520 shown in FIG. 5A have a phase difference of 360°/2=180°.

Meanwhile, as shown in FIGS. 5A and 5B, the capacitor current Ic flowing into the dc terminal capacitor C is determined by the difference between the output current Ico of the interleaved boost converter 526 and the load current supplied to the load 205, i.e., the inverter 220 or the inverter output Ii.

(a) of FIG. 6B illustrates the waveform of the output current Ico of the interleaved boost converter 520, (b) of FIG. 6B illustrates the waveform of the inverter output Ii, and (c) of FIG. 6B illustrates the waveform of the capacitor current Ic flowing into the dc terminal capacitor C.

In particular, the currents shown in FIG. 6B are currents when the first boost converter 523 and the second boost converter 526 have a phase difference of 180°.

Meanwhile, (a) of FIG. 6C illustrates the frequency characteristic FIco of the output current Ico of the interleaved boost converter 520, (b) of FIG. 6C illustrates the frequency characteristic FIi of the inverter output Ii, and (c) of FIG. 6C illustrates the frequency characteristic FIc of the capacitor current Ic flowing into the dc terminal capacitor C.

Frequency bands 610, 620, and 630 with a large ripple component are created, as shown in the drawing, by the switching frequency of the interleaved boost converter 520 and the switching frequency of the inverter 220.

In particular, as can be seen from the frequency characteristic FIc of the capacitor current Ic flowing into the dc terminal capacitor C, a large ripple component arises in a particular frequency band 630.

Accordingly, in the present invention, if the ripple in the capacitor current Ic flowing into the dc terminal capacitor C is a predetermined value or greater, the phase difference between the boost converters of the interleaved boost converter 520 is not limited to a fixed amount but may vary. This will be described with reference to FIG. 7 below.

Figure 7:
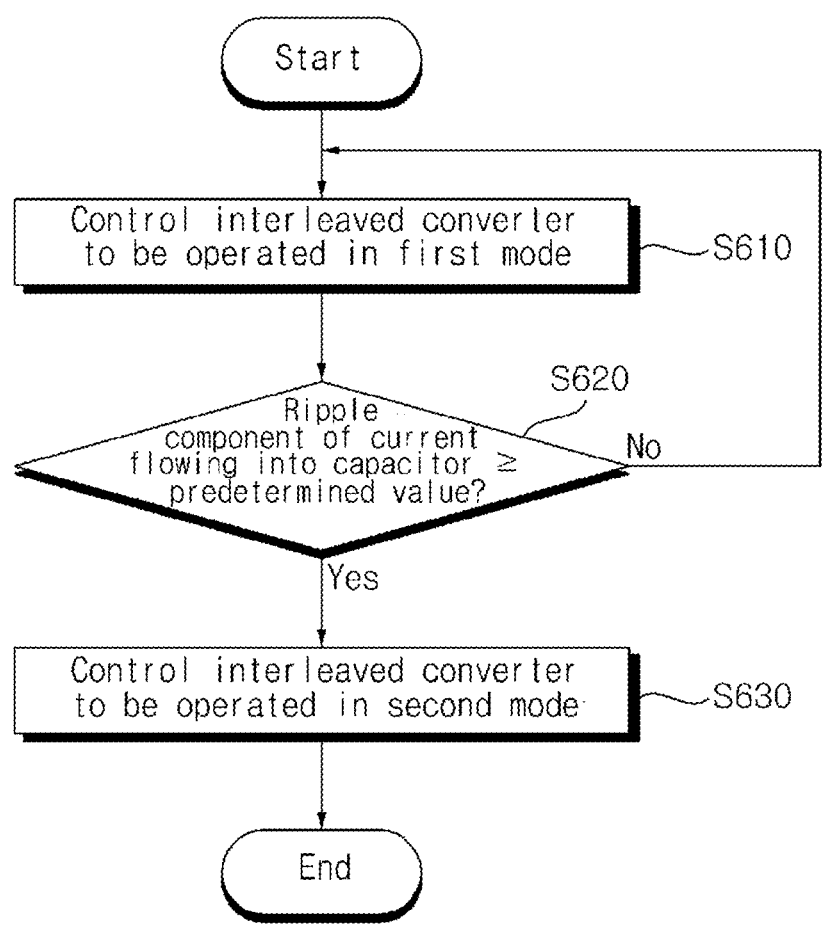
FIG. 7 is a flowchart showing an operation method of a power conversion device according to an exemplary embodiment of the present invention.

FIG. 7 is a flowchart showing an operation method of a power conversion device according to an exemplary embodiment of the present invention. FIGS. 8A to 12B are diagrams to be used a reference to explain the operation method of FIG. 7.

First of all, referring to FIG. 7, the converter controller 215 controls the interleaved boost converter 520 to operate in the first mode (S610). That is, as shown in FIG. 6A, etc., the boost converters of the interleaved boost converter 520 may be controlled to operate with a fixed phase difference between them.

For example, if there are two boost converters within the interleaved boost converter 520, the boost converters may be controlled to have a phase difference of 180°.

In another example, if there are three boost converters within the interleaved boost converter 520, the boost converters may be controlled to have a phase difference of 120°.

Next, the converter controller 215 determines if a current ripple flowing in the dc terminal capacitor C is a predetermined value or greater (S620), and, if so, controls the interleaved boost converter 520 to operate in the second mode (S630). That is, the boost converters of the interleaved boost converter 520 may be controlled so that the phase difference between them varies.

Meanwhile, the converter controller 215 may determine the current ripple flowing in the dc terminal capacitor C by using a current detector G1 for detecting the current at the output terminal of the interleaved boost converter 520 of FIG. 5A or FIG. 5B and a current detector G2 for detecting the current flowing in the inverter.

Alternatively, in another example, the current ripple flowing in the dc terminal capacitor C may be determined directly by using a current detector G3 for detecting the current flowing in the dc terminal capacitor C of FIG. 5A or FIG. 5B.

As shown in FIG. 6C, if the amount of a current ripple component in a particular frequency band 630 is a predetermined value or greater, the converter controller 215 may enter the second mode and control the first boot converter 523 and second boost converter 526 of the interleaved boost converter 520 so that the phase difference between them varies.

Figure 8A:
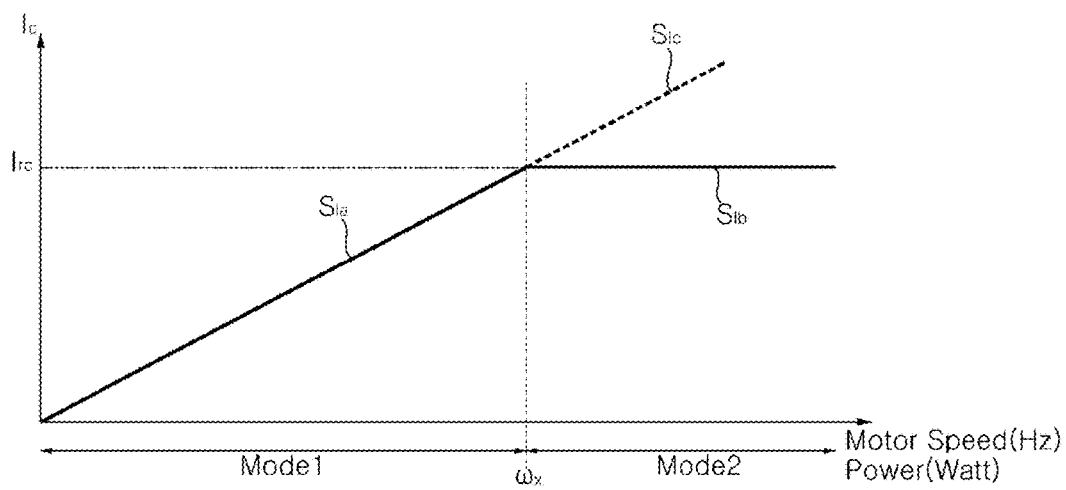
FIGS. 8A to 12B are diagrams to be used a reference to explain the operation method of FIG. 7.

FIG. 8A is a diagram to be used as a reference to explain the operations in the first and second modes.

Referring to the drawing, the horizontal axis represents motor speed or power, and the vertical axis represents the amount of current Ic flowing in the capacitor.

Referring to the drawing, a graph Sia shows that, in the first mode Mode 1, the amount of current flowing in the capacitor increases sequentially as the motor speed increases.

In this case, if the amount of current flowing in the capacitor is a predetermined value Irc or greater and the converter controller 215 enters the second mode, the phase difference between the boost converters is controlled to vary so that the current flowing in the capacitor is reduced.

Accordingly, as shown in the drawing, a graph Sib shows that, in the second mode, the amount of current flowing in the capacitor remains near the predetermined value Irc.

Meanwhile, although FIG. 6 illustrates the first mode for fixing the phase difference between the boost converters and the second mode for varying it, separately, the phase difference between the boost converters may vary with the load according to another exemplary embodiment of the present invention.

Moreover, the phase difference between the boost converters may be varied continuously by detecting the current flowing in the capacitor in real time.

Particularly, the converter controller 215 may control the first boost converter and second boost converter of the interleaved boost converter so that the phase difference between them increases as the load on the converter output terminal increases or so that the phase difference between them decreases as the load on the converter output terminal decreases. Accordingly, the ripple current flowing into the capacitor disposed at the output terminal of the interleaved boost converter can be reduced.

Figure 8B:
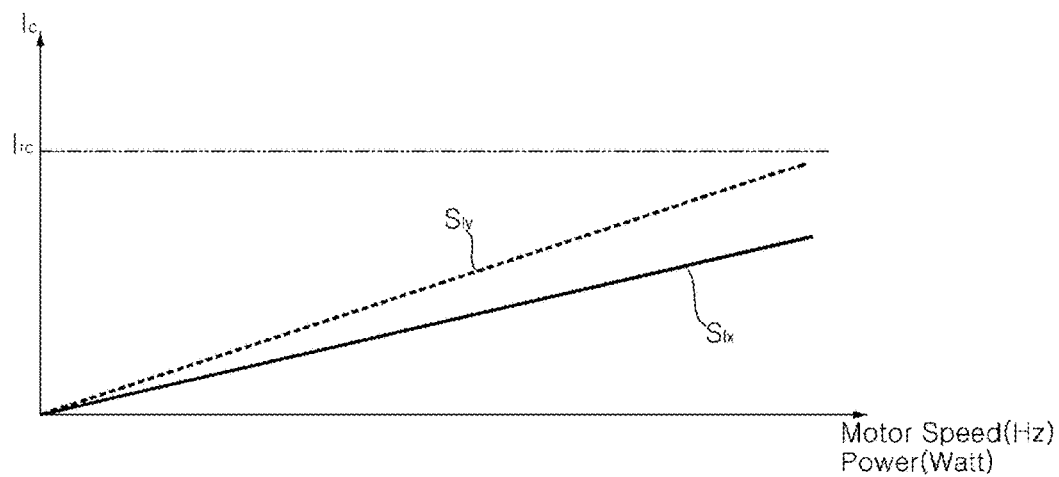

In this way, the graph characteristic Slx may be seen as in FIG. 8B. That is, if the first mode area in FIG. 8A is replaced by the second mode area, the rate of increase in the amount of current flowing in the capacitor is lower than that in FIG. 8A, even if the motor speed increases as in the drawing.

FIG. 8B illustrates a graph Slx showing a much lower rate of increase compared to the graph Sly for the first mode operation.

Figure 9A:
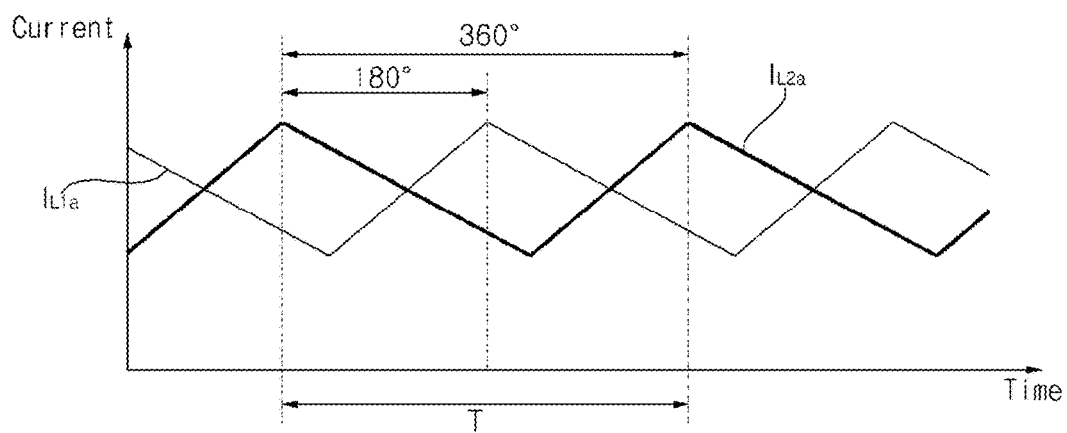
Figure 9B:
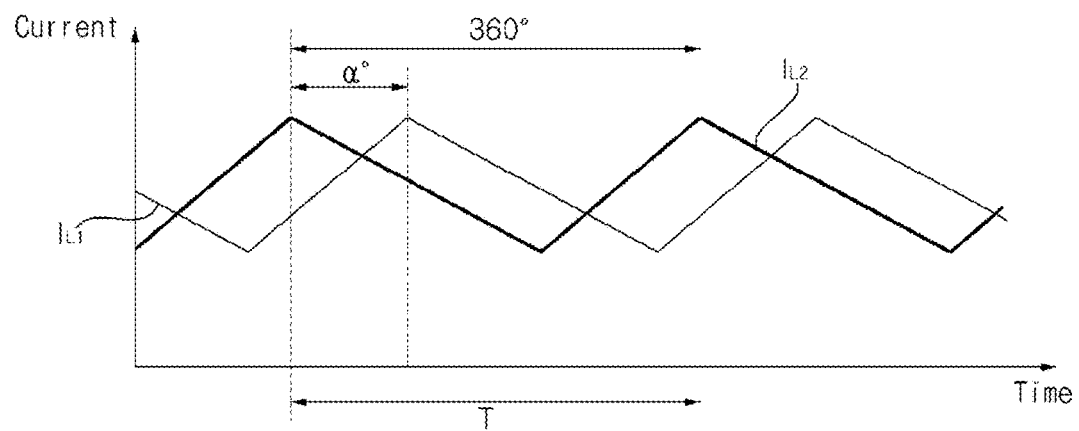

FIG. 9A illustrates that an interleaved boost converter including two boost converters operate in the first mode, and FIG. 9B illustrates that it operates in the second mode in which the phase difference varies.

That is, FIG. 9A illustrates that the phase difference between the currents $I_{L1a}$ and $I_{L2a}$ flowing in the inductors L1 and L2 of each boost converter is 180°, and FIG. 9B illustrates that the phase difference between the currents $I_{L1a}$ and $I_{L2a}$ flowing in the inductors L1 and L2 of each boost converter is α°.

Figure 10:
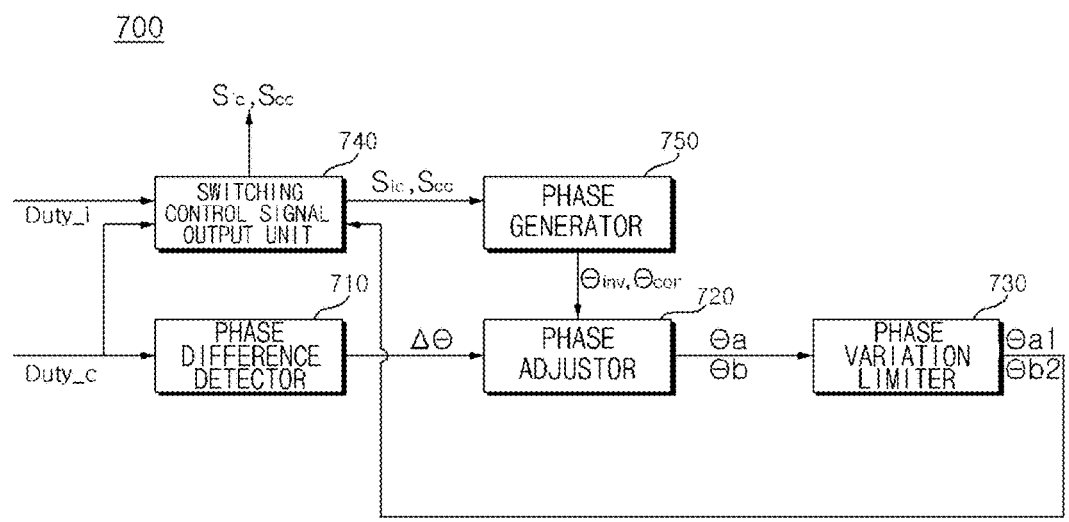

FIG. 10 is an exemplary internal block diagram of a controller for varying phase difference.

The components in the controller 700 of FIG. 10 may be included within the above-described converter controller 215 of FIG. 3. That is, they may be included together with the components of FIG. 4B.

Meanwhile, if the converter controller 215 and inverter controller 230 of FIG. 3 are integrated as one, the components in the controller 700 of FIG. 10 may be part of the integrated controller.

Referring to the drawing, the controller 700 may include a phase difference detector 710 for detecting the phase difference Δθ between the boost converters within the interleaved boost converter 520, a phase adjuster 720 for adjusting the phases based on the detected phase difference Δθ, and a switching control signal output part 740 for outputting a switching control signal Scc to the boost converters within the interleaved boost converter 520 based on the adjusted phases ea and θb.

A duty signal duty_c for converter switching control from the voltage command generator 420 of FIG. 4B may be input into the phase difference detector 710 and the switching control signal output part 740. Here, the switching control signal output part 740 may be the switching control signal output part 430 of FIG. 4B.

Alternatively, the switching control signal output part 740 may output the converter switching control signal Scc and an inverter switching control signal Sicc together.

Meanwhile, the controller 700 may further include a phase output part 750 for outputting phases θinv and θcon based on the switching control signal output part 740.

Meanwhile, the phase adjuster 720 may adjust the phases based on the phases θinv and θcon from the phase adjuster 720 and the detected phase difference Δθ from the phase difference detector 710, and output the adjusted phases θa and θb.

Meanwhile, the controller 700 may further include a phase variation limiter 730 that limits phase variations in the adjusted phases θa and θb output from the phase adjuster 720 and outputs, to the switching control signal output part 740, phase values θ1a and θ1b whose phase variations are limited.

Figure 11A:
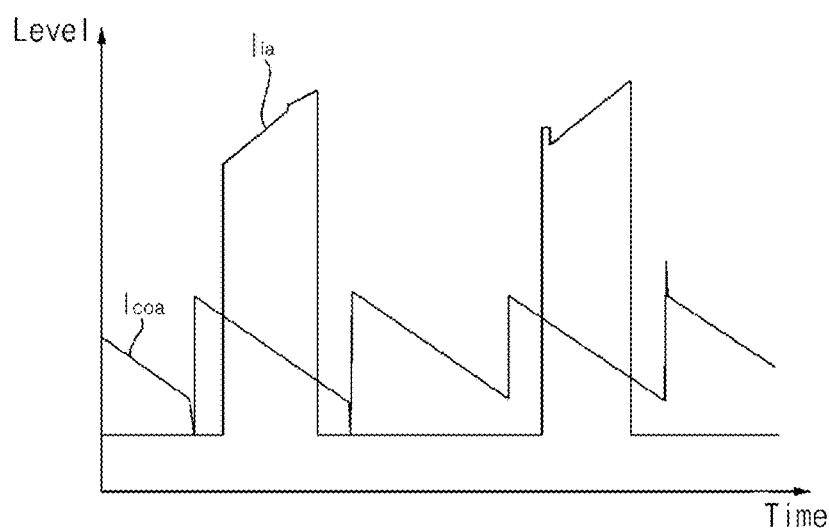

FIG. 11A illustrates an example of the current Iia input into the inverter and the current Icoa output from the interleaved boost converter 520.

This figure illustrates that the overlap region between the current Iia input into the inverter and the current Icoa output from the interleaved boost converter 520 is small. Due to this, the current Iia input into the inverter and the current Icoa output from the interleaved boost converter 520 are not synchronized, leading to a large ripple in the current flowing in the dc terminal capacitor C.

In order to reduce the ripple in the current flowing in the dc terminal capacitor C, the converter controller 215 may vary the phase difference between the first boost converter 523 and second boost converter 526 of the interleaved boost converter 520, so that the current output from the interleaved boost converter 520 and the current flowing into the load 205 are synchronized.

That is, the converter controller 215 may vary the phase difference between the first boost converter 523 and second boost converter 526 of the interleaved boost converter 520, so that the overlap region between the current output from the interleaved boost converter 520 and the current flowing into the load 205 is the largest.

Figure 11B:
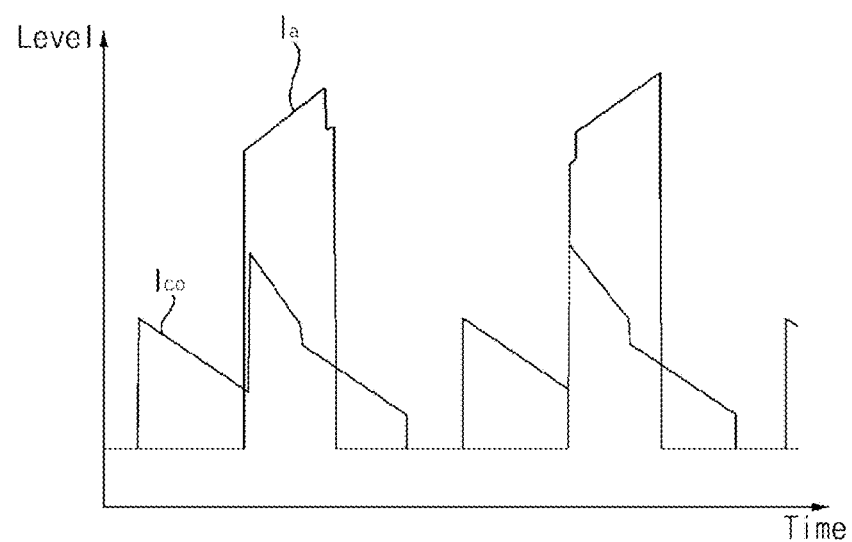

Next, FIG. 11B illustrates another example of the current Iia input into the inverter and the current Icoa output from the interleaved boost converter 520.

When the converter controller 215 performs phase difference variation, the overlap region between the current Ia input into the inverter and the current Ico flowing into the load 205 becomes the largest and the ripple in the current flowing in the dc terminal capacitor C becomes smaller, as shown in the drawing.

This figure illustrates that the current Ia input into the inverter and the current Ico output form the interleaved boost converter 520 rise to high level in the same area.

That is, the converter controller 215 may control the current Ia input into the inverter and the current Ico output form the interleaved boost converter 520 to rise to high level in the same area.

Figure 12A:
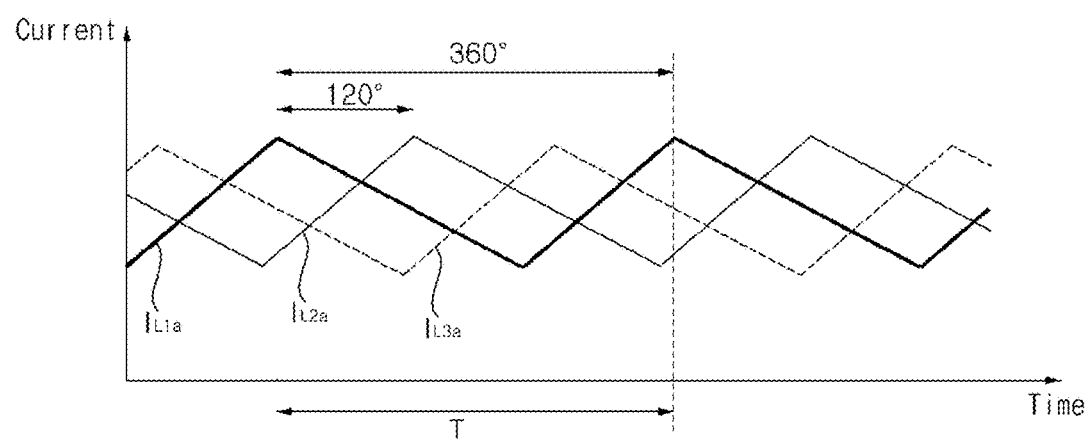
Figure 12B:
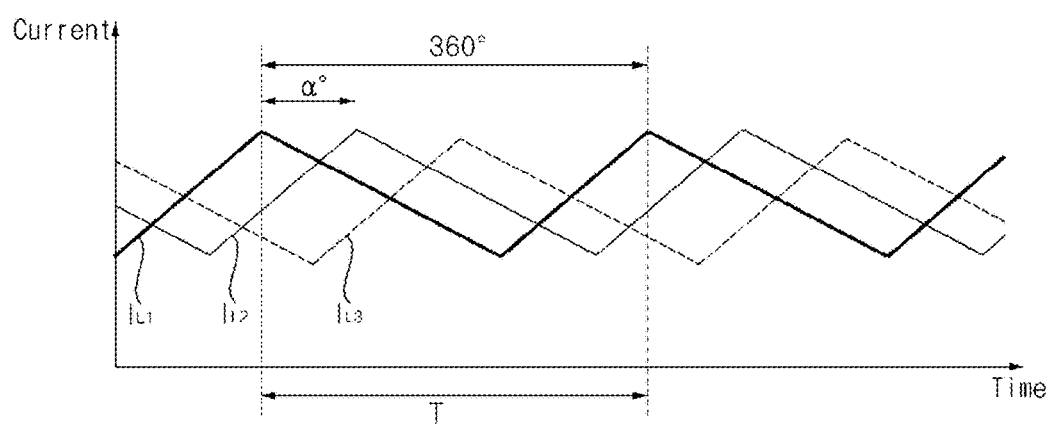

FIG. 12A illustrates that an interleaved boost converter including three boost converters operate in the first mode, and FIG. 12B illustrates that it operates in the second mode in which the phase difference varies.

That is, FIG. 12A illustrates that the phase difference among the currents $I_{L1a}$, $I_{L2a}$, and $I_{L3a}$ flowing in the inductors L1, L2, and L3 of each boost converter is 120°, and FIG. 12B illustrates that the phase difference among the currents $I_{L1a}$, $I_{L2a}$, and $I_{L3a}$ flowing in the inductors L1, L2, and L3 of each boost converter is α°.

Meanwhile, the power conversion device of the present invention may be applied to various appliances as well as an air conditioner—for example, laundry machines, cooking appliances, refrigerators, TVs, etc. Furthermore, it may be applied to various electronic appliances that employ an interleaved boost converter for varying the direct current power level.

Meanwhile, an operation method of a power conversion device or air conditioner according to the present invention may be implemented in the form of processor-readable program codes in a recording medium that may be read by a processor installed in the air conditioner. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

While the exemplary embodiments of the present invention have been illustrated and described above, the present invention is not limited to the aforementioned specific exemplary embodiments, various modifications may be made by a person with ordinary skill in the art to which the present invention pertains without departing from the subject matters of the present invention that are claimed in the claims, and these modifications should not be appreciated individually from the technical spirit or prospect of the present invention.

The invention claimed is:

1. A power conversion device comprising:
an interleaved boost converter;
a dc terminal capacitor connected to an output terminal of the interleaved boost converter;
a load connected to the dc terminal capacitor; and
a controller for controlling the interleaved boost converter,
wherein the controller controls a phase difference between a first boost converter and a second boost converter of the interleaved boost converter so that the phase difference is a first phase difference in a first mode, and if a current ripple flowing in the dc terminal capacitor is a predetermined value or greater, the controller enters a second mode and controls the phase difference between the first boost converter and the second boost converter of the interleaved boost converter so that the phase difference varies,
wherein the controller comprises:
a phase difference detector for detecting the phase difference between the boost converters within the interleaved boost converter;
a phase adjuster for adjusting the phases based on the detected phase difference;
a switching control signal output part for outputting a switching control signal to the boost converters within the interleaved boost converter based on the adjusted phases; and
a phase output part for outputting phases based on the switching control signal output part,
wherein the phase adjuster adjusts the phases based on the phases output from the phase adjuster and the detected phase difference from the phase difference detector.

2. The power conversion device of claim 1, wherein the controller varies the phase difference between the first boost converter and the second boost converter of the interleaved boost converter so that the current output from the interleaved boost converter and the current flowing into the load are synchronized in the second mode.

3. The power conversion device of claim 1, wherein the controller varies the phase difference between the first boost converter and the second boost converter of the interleaved boost converter so that the overlap region between the current output from the interleaved boost converter and the current flowing into the load is the largest in the second mode.

4. The power conversion device of claim 1, wherein, if the number of boost converters within the interleaved boost converter is n, the controller controls the boost converters to have a phase difference of 360°/n in the first mode.

5. The power conversion device of claim 1, wherein the controller further comprises a phase variation limiter that limits phase variations in the adjusted phases output from the phase adjuster and outputs, to the switching control signal output part, phase values whose phase variations are limited.

6. The power conversion device of claim 1, wherein the load comprises an inverter that has a plurality of switching elements and outputs alternating current power to a motor by using the voltage stored in the dc terminal capacitor,
wherein the controller further controls the inverter.

7. The power conversion device of claim 1, wherein the load comprises an inverter that has a plurality of switching elements and outputs alternating current power to a motor by using the voltage stored in the dc terminal capacitor,
the load further comprising an inverter controller for controlling the inverter.

8. An air conditioner comprising:
a compressor that compresses a refrigerant;
a heat exchanger that transfers heat using the compressed refrigerant; and
a power conversion device for driving the compressor,
the power conversion device comprising the power conversion device of claim 1.

9. A power conversion device comprising:
an interleaved boost converter;
a dc terminal capacitor connected to an output terminal of the interleaved boost converter;
a load connected to the dc terminal capacitor; and
a controller for controlling the interleaved boost converter,
wherein the controller controls a phase difference between a first boost converter and a second boost converter of the interleaved boost converter so that the phase difference varies with the load,
wherein the controller comprises:
a phase difference detector for detecting the phase difference between the boost converters within the interleaved boost converter;
a phase adjuster for adjusting the phases based on the detected phase difference;
a switching control signal output part for outputting a switching control signal to the boost converters within the interleaved boost converter based on the adjusted phases; and
a phase output part for outputting phases based on the switching control signal output part,
wherein the phase adjuster adjusts the phases based on the phases from the phase adjuster and the detected phase difference from the phase difference detector.

10. The power conversion device of claim 9, wherein the controller controls the first boost converter and the second boost converter of the interleaved boost converter so that the phase difference increases as the load increases.

11. The power conversion device of claim 9, wherein the controller varies the phase difference between the first boost converter and the second boost converter of the interleaved boost converter so that the current output from the interleaved boost converter and the current flowing into the load are synchronized.

12. The power conversion device of claim 9, wherein the controller varies the phase difference between the first boost converter and the second boost converter of the interleaved boost converter so that the overlap region between the current output from the interleaved boost converter and the current flowing into the load is the largest.

13. The power conversion device of claim 9, wherein the controller further comprises a phase variation limiter that limits phase variations in the adjusted phases output from the phase adjuster and outputs, to the switching control signal output part, phase values whose phase variations are limited.

* * * * *